US008943440B2

(12) United States Patent
Adderton

(10) Patent No.: US 8,943,440 B2
(45) Date of Patent: Jan. 27, 2015

(54) METHOD AND SYSTEM FOR ORGANIZING APPLICATIONS

(71) Applicant: Digital Turbine, Inc., Los Angeles, CA (US)

(72) Inventor: Peter Adderton, Newport Beach, CA (US)

(73) Assignee: Digital Turbine, Inc., Los Angeles, CA (US)

( * ) Notice: Subject to any disclaimer, the term of this patent is extended or adjusted under 35 U.S.C. 154(b) by 78 days.

(21) Appl. No.: 13/654,389

(22) Filed: Oct. 17, 2012

(65) Prior Publication Data

US 2013/0346919 A1 Dec. 26, 2013

Related U.S. Application Data

(60) Provisional application No. 61/664,723, filed on Jun. 26, 2012, provisional application No. 61/693,768, filed on Aug. 27, 2012.

(51) Int. Cl.
*G06F 3/048* (2013.01)

(52) U.S. Cl.
USPC ............ 715/835; 715/810; 715/863; 345/173

(58) Field of Classification Search
CPC ............. G06F 3/00; G06F 3/01; G06F 3/041; G06F 3/048
USPC ......... 715/702, 733, 738, 764, 765, 810, 835, 715/863, 864; 345/169, 173
See application file for complete search history.

(56) References Cited

U.S. PATENT DOCUMENTS

| | | | |
|---|---|---|---|
| 7,054,900 | B1 | 5/2006 | Goldston |
| 7,698,302 | B2 | 4/2010 | Wendelrup |
| 7,756,880 | B2 | 7/2010 | Sighart et al. |
| 7,958,119 | B2 | 6/2011 | Eggink et al. |
| 8,095,153 | B2 | 1/2012 | Jenkins et al. |
| 8,180,688 | B1 | 5/2012 | Velummylum et al. |
| 8,185,096 | B2 | 5/2012 | Smith et al. |
| 8,340,796 | B2 | 12/2012 | Stefik |
| 8,392,282 | B2 | 3/2013 | Nagasaka et al. |
| 8,417,263 | B2 | 4/2013 | Jenkins et al. |
| 8,515,409 | B2 | 8/2013 | Ramo et al. |
| 8,539,359 | B2 | 9/2013 | Rapaport et al. |
| 8,548,876 | B1 | 10/2013 | Fox et al. |
| 8,560,486 | B2 | 10/2013 | Pascual Leo et al. |
| 8,577,398 | B2 | 11/2013 | Dudley et al. |
| 8,666,525 | B2 | 3/2014 | Stefik |
| 8,688,699 | B2 | 4/2014 | Eggink et al. |
| 8,688,805 | B2 | 4/2014 | Swanburg et al. |
| 8,694,666 | B2 | 4/2014 | Dixon |
| 8,725,180 | B2 | 5/2014 | Lee et al. |
| 8,793,031 | B2 | 7/2014 | Anantha et al. |

(Continued)

OTHER PUBLICATIONS

Office Action in U.S. Appl. No. 13/654,386, USPTO, Alexandria, VA, dated Jul. 14, 2014.

*Primary Examiner* — Xiomar L Bautista
(74) *Attorney, Agent, or Firm* — Nixon Peabody LLP; Rhys W. Cheung

(57) ABSTRACT

A system and method for automatically organizing a user interface. A category is determined for content installed on a device. An icon for the content is displayed in a categorical row in a grid layout for the content's category. The categorical rows may be manipulated by touchscreen gestures, such as moving, expanding, and revealing details about the row, such as the row's categorical label.

12 Claims, 15 Drawing Sheets

(56) References Cited

U.S. PATENT DOCUMENTS

| | | |
|---|---|---|
| 2003/0028884 A1 | 2/2003 | Swart et al. |
| 2007/0269787 A1 | 11/2007 | Cronstrom |
| 2008/0133601 A1 | 6/2008 | Martin Cervera et al. |
| 2008/0139112 A1 | 6/2008 | Sampath et al. |
| 2008/0215490 A1 | 9/2008 | Howard et al. |
| 2009/0163183 A1 | 6/2009 | O'Donoghue et al. |
| 2010/0169153 A1 | 7/2010 | Hwacinski et al. |
| 2011/0125783 A1 | 5/2011 | Whale et al. |
| 2011/0199322 A1 | 8/2011 | Langlois et al. |
| 2011/0238608 A1 | 9/2011 | Sathish |
| 2011/0307354 A1 | 12/2011 | Erman et al. |
| 2012/0064820 A1 | 3/2012 | Bemmel |
| 2012/0077470 A1 | 3/2012 | Kim et al. |
| 2012/0110565 A1 | 5/2012 | O'Sullivan et al. |
| 2012/0123865 A1* | 5/2012 | Salzano .................... 705/14.55 |
| 2012/0246302 A1 | 9/2012 | Lafleur et al. |
| 2012/0331137 A1 | 12/2012 | Olsen et al. |
| 2013/0047123 A1* | 2/2013 | May et al. ..................... 715/834 |
| 2013/0085851 A1 | 4/2013 | Pedro et al. |
| 2013/0139163 A1 | 5/2013 | Nagasaka et al. |
| 2013/0263018 A1 | 10/2013 | Xiong et al. |
| 2013/0278710 A1* | 10/2013 | Mock ......................... 348/14.03 |
| 2013/0317910 A1 | 11/2013 | Mohamed |
| 2013/0346195 A1 | 12/2013 | Adderton |
| 2013/0346840 A1 | 12/2013 | Adderton |
| 2014/0089967 A1 | 3/2014 | Mandalia et al. |

* cited by examiner

METHOD AND SYSTEM FOR ORGANIZING APPLICATIONS

CROSS-REFERENCE TO RELATED APPLICATIONS

The present application claims the benefit of priority of U.S. Provisional Patent Application No. 61/664,723, filed on Jun. 26, 2012, and U.S. Provisional Patent Application No. 61/693,768, filed on Aug. 27, 2012, the contents of both of which are incorporated by reference as if fully set forth herein.

The present application is related to U.S. patent application Ser. No. 13/654,386, filed on even date herewith, and U.S. patent application Ser. No. 13/654,395, filed on even date herewith, the contents of both of which are incorporated by reference as if fully set forth herein.

FIELD OF THE INVENTION

The present field of invention relates generally to a user interface for presenting and accessing content, and more particularly but not exclusively for presenting and accessing application and media content.

BACKGROUND OF THE INVENTION

In a graphical user interface computing environment, files and other data content are represented as touchable or clickable user interface elements, or icons. The icons may be automatically arranged in an interface by Name, Size, Type, or Date, or arranged by the user manually. In certain computing environments, for example, a mobile device environment such as a smart phone, tablet computer, or a personal digital assistant, icons for launching software applications, or "apps," may be arranged in an interface by Name, Installation Date, or manually arranged by the user. However, these arrangements may not provide a user with the best way to organize the presentation of icons in an interface. It is desirable to have other ways to automatically arrange application icons for a better user experience.

In a computing environment, users may add apps by visiting an electronic vendor, such as the Apple App Store, Google Play, Amazon Appstore, or other vendor interfaces. Such vendors may provide a web-based interface or provide an app interface for selling and providing other apps. Vendor interfaces may provide recommendations to users for apps, for example, a Recommended For You section in the vendor interface. It is desirable to have other ways to recommend apps for a better user experience.

Content providers may provide aggregations of content for a particular subject matter. In one approach, the content aggregations may be provided to a user in response to a user's submission of search terms. It is desirable to have other ways to provide content aggregations for a better user experience.

BRIEF SUMMARY

In accordance with a preferred embodiment of the invention, a user interface is provided for automatically recommending content for downloading or communicating to the user's device, including applications, media, and other content, by displaying a modified icon, such as an application icon with some degree of transparency, for example, a ghost icon on a grid layout. The ghost icon, when touched or clicked, directly initiates the process for communicating the recommended content directly from the grid layout.

In accordance with a preferred embodiment of the invention, a user interface is provided for automatically organizing applications into categorical groups in the interface. In one example, a grid interface is divided into rows, where each row represents a category. All apps from a common category are automatically associated with the row. On a home page, a limited group of applications are visible at a time. The row can be touched or clicked to expand the interface to show more applications from the category.

In accordance with preferred embodiments of the invention, a user interface is provided for automatically presenting a set of one or more keywords. The set of keywords are presented in response to determining that several of the keywords appear on a webpage that was loaded in response to a user's request into a browser interface. The set of presented keywords are from among a set of promotional keywords, for example, keywords that are sponsored to be promoted, keywords that correspond to a user's personal data, such as key contacts. The keywords that are chosen to be presented are selected by performing the method of extracting words from a webpage, comparing the extracted words against the set of promotional keywords, finding matching keywords, and presenting the matched keywords in a user interface. The keywords may be presented with a thumbnail image in the interface. The thumbnail image or keywords may be touched or clicked through on the interface to open additional content. For example, touching a presented keyword may open a brand page relating to the keyword.

In accordance with preferred embodiments of the invention, brand pages are content aggregations for a particular keyword, which may correspond to an entity, brand, product, or individual person. Brand pages may include content for the entity, brand, product, or individual from a content management server, from local storage, or from social networking sources associated with the entity, brand, product, or individual, including images, contact information, location data, social media feeds. Brand pages may also include user interface controls for launching communication with the entity, and may presented a view of the entity's or individual's last communications with the user.

This brief summary is provided to introduce a selection of concepts in a simplified form that are further described in the detailed description. It is not intended to be exhaustive or to limit the invention to the precise forms disclosed.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Other and further features and advantages of the present invention will be apparent from the following descriptions of the various embodiments when read in conjunction with the accompanying drawings. It will be understood by one of ordinary skill in the art that the following embodiments are provided for illustrative and exemplary purposes only, and that numerous combinations of the elements of the various embodiments of the present invention are possible. Exemplary methods, apparatus, and systems for providing a user interface for presenting and accessing content according to preferred embodiments of the present invention are described with reference to the accompanying figures, beginning with FIG. 1.

Figure 1:
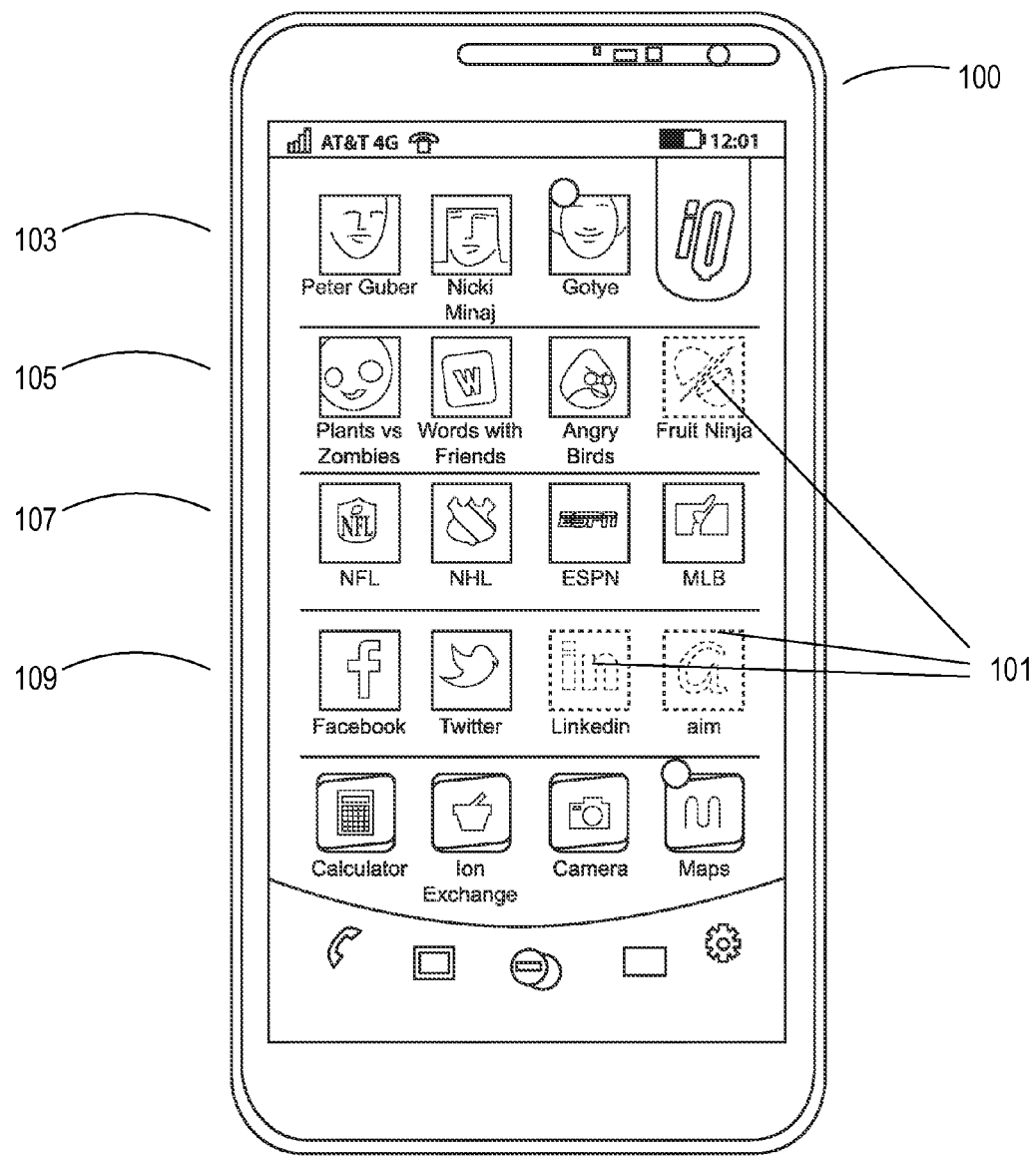
FIG. 1 is a view of a user interface for presenting automatic recommendations for content, according aspects of some embodiments of the invention.

FIG. 1 is a view 100 of a user interface for presenting automatic recommendations for content, according to aspects of the invention. Ghost icons 101 are presented to a user among a grid of icons of installed applications or shortcuts to recommend applications to a user. In some embodiments, ghost icons 101 are partially transparent versions of the content's standard icon, although ghost icons may comprise other variations of the standard icon without departing from the spirit of the invention. In some embodiments, the recommendations are based on a user's transaction and/or content purchase history, including previous content selection. In one example, the user's transaction and/or content purchase history are used to determine applications that are positively correlated with the type of user with such transaction and/or content purchase history. For example, applications that are positively correlated with the type of user include those that the type of user is likely to buy, to appeal to the user, to download, or to request more information about. In another example, applications similar to those of the user's transaction and/or content purchase history are used to determine recommendations. In another example, applications also purchased or selected by another user of the user's type are used to determine recommendations.

With further reference to FIG. 1, a grid layout for user interface 100, such as the one shown in FIG. 1, is automatically organized into categories in the interface. A user interface for a device has one or more user interface elements, such as touchscreen buttons or icons, for accessing applications, hyperlinks, or other assets. The user interface elements are organized by rows, with each row corresponding to a category or "channel." In one example, a view of grid interface 100 is divided into rows, where each row represents a category. For example, row 103 relates to the category of brand pages for people, row 105 relates to the category of games, row 107 relates to the category of sports, row 109 relates to the category of social media. As such, all apps from a common category are automatically associated with a row. While the above examples are of particular categories, it is understood that other categories may be defined and used in accordance with principles of embodiments of the invention without departing from the spirit of the invention.

Figure 2:
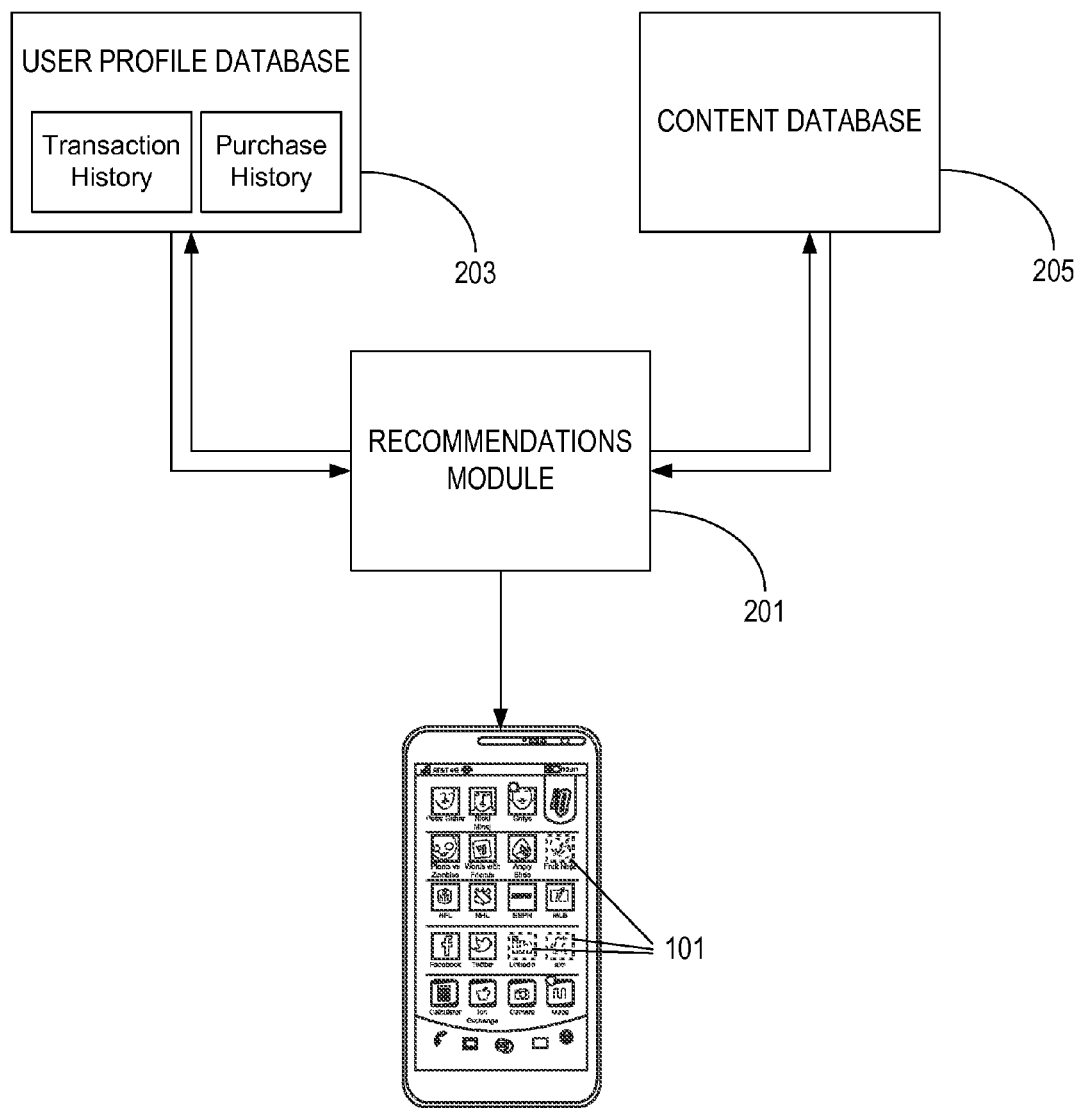
FIG. 2 is a block diagram illustrating a system for automatically recommending content, according aspects of some embodiments of the invention.

FIG. 2 is a block diagram illustrating a portions of a system for automatically recommending content, such as applications, according to embodiments of the invention. A recommendations module 201 on a provider's computer server considers a user's transaction and/or content purchase history from a user profile stored on a user profile database. A recommendations module 201 reviews and considers content information from content database 205 to determine recommendations. In one example, recommendations module 201 reviews content database 205 for applications known to be likely to appeal to or positively correlate with the user's type for recommending to the user. For example, applications that are positively correlated with the type of user include those that the type of user is likely to buy. A user's type includes the group of people sharing the user's characteristics. A user's demographic can be an example of user's type. The user's type are determined based on a review of at least the user's transaction and/or content purchase history from a user's profile stored in user profile database 203. In another example, popular applications related to the user's transaction and/or content purchase history are determined for recommending to the user. In some embodiments of the invention, after determining the applications to recommend, the provider's computer server initiates a series of communications and actions resulting in ghost icons 101 being presented in the user's applications and shortcut grid layout. For example, the provider's computer server sends instructions and an icon image for a recommended content to the device, which implements the instructions to present a ghost icon having the icon image in the layout. As such, the provider's computer server causes ghost icons 101 representing the recommended content to be shown. In some embodiments, ghost icons 101 are displayed in their categorical row with other standard icons in the interface.

Figure 3:
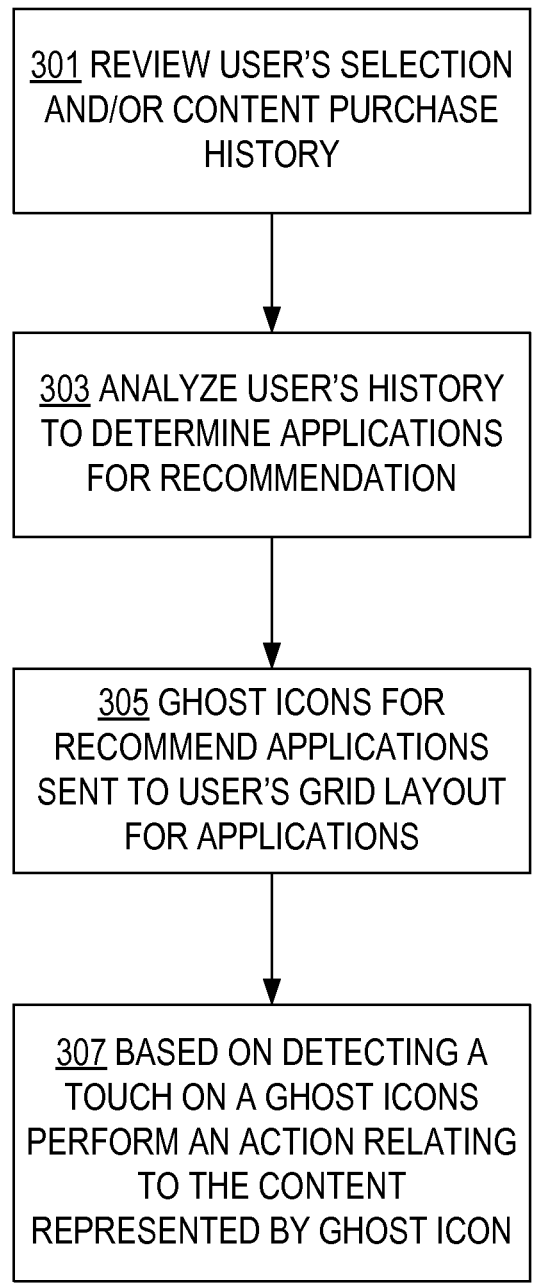
FIG. 3 is a flow diagram illustrating a process for presenting automatic recommendations for content, according aspects of some embodiments of the invention.

FIG. 3 is a flow diagram illustrating a process for presenting automatic recommendations for content, according to aspects of the invention. In some embodiments, the user interface as shown in FIG. 1 is used the method. The method is useful for marketing applications to a user in accordance with principles of preferred embodiments of the invention. At step 301, a user's transaction and/or content purchase history is first considered and reviewed. At step 303, the user's transaction and/or content purchase history analyzed to select one or more applications for recommendation for the user. For example, user's transaction and/or content purchase history is analyzed to determine user's type, and applications known to be likely to appeal to the user's type are chosen. In another example, popular applications classified as similar to user's transaction and/or content purchase history are selected. At step 305, ghost icons are sent to and appear in the user interface of the device to recommend apps based upon users selected and/or content purchase history. At step 307, performing an action relating to the content represented by the ghost icon based on detecting a touch on the ghost icon, including any one or more of launching installer for the recommended application; beginning and completing a purchase transaction or other necessary transaction; and communicating content to the user's device. In some embodiments, the purchase transaction is verified as having been completed before the content is communicated to the user's device.

Figure 4:
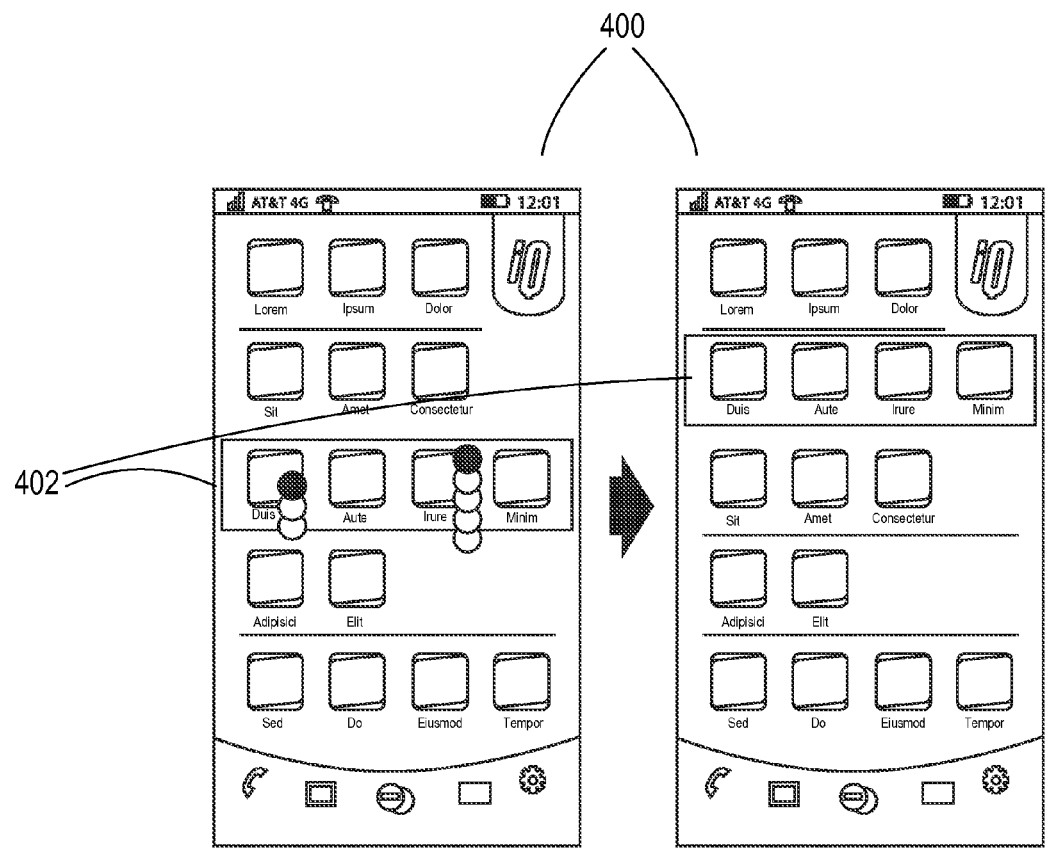
FIG. 4 is a view of a user interface for automatically organizing applications into categorical groups, and user interface gestures for rearranging the categorical groups in a user interface, according to aspects of some embodiments of the invention.

FIG. 4 illustrates a manipulating gesture for a user interface for automatically organizing and arranging applications or icons into categorical rows as described above with reference to FIG. 1 in accordance with principles of preferred embodiments of the invention. As shown, tapping and holding row 402 with two fingers will allow row 402 to be selected from interface 400 and moved a different location by displacing other rows, or moved to a different page. As each row's applications correspond to a category, and this feature allows for a category of user interface elements to be moved at once to another location in interface 400. While the example shows the two-finger gesture as used for moving rows, other gestures may be used for selecting the moving action without departing from the spirit of the invention.

According to embodiments of the invention, each grid icon is correlated with a a category, also referred to as a channel. As the icon is installed in the grid information, for example, such as by installing an app or creating a shortcut, the UI on the phone will automatically categorize the icon into a channel.

Figure 5:
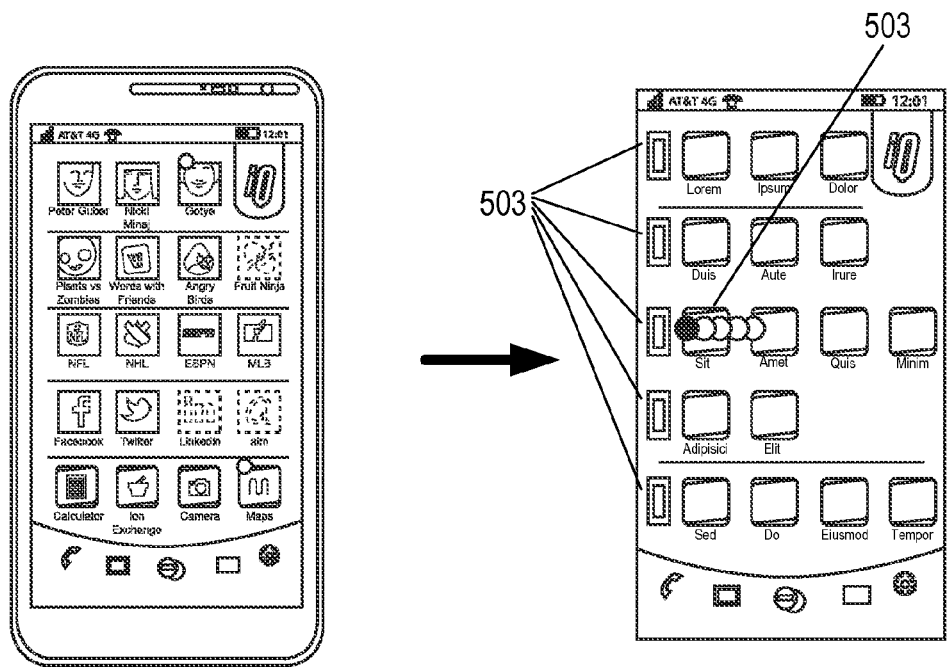
FIG. 5 is a view of a user interface for automatically organizing applications into categorical groups, and user interface gestures for showing category headers for the categorical groups in a user interface, according to aspects of some embodiments of the invention.

FIG. 5 illustrates a manipulating gesture for indicating channels/categories names with a one-finger click gesture in accordance with preferred embodiments of the invention. A touchscreen gesture, such as a single-finger tap-hold-move gesture, as shown by the trail of dots 501, is interpreted by the interface as a command to reveal labels 503 at the head of each row corresponding to a channel/category for the row.

Figure 6:
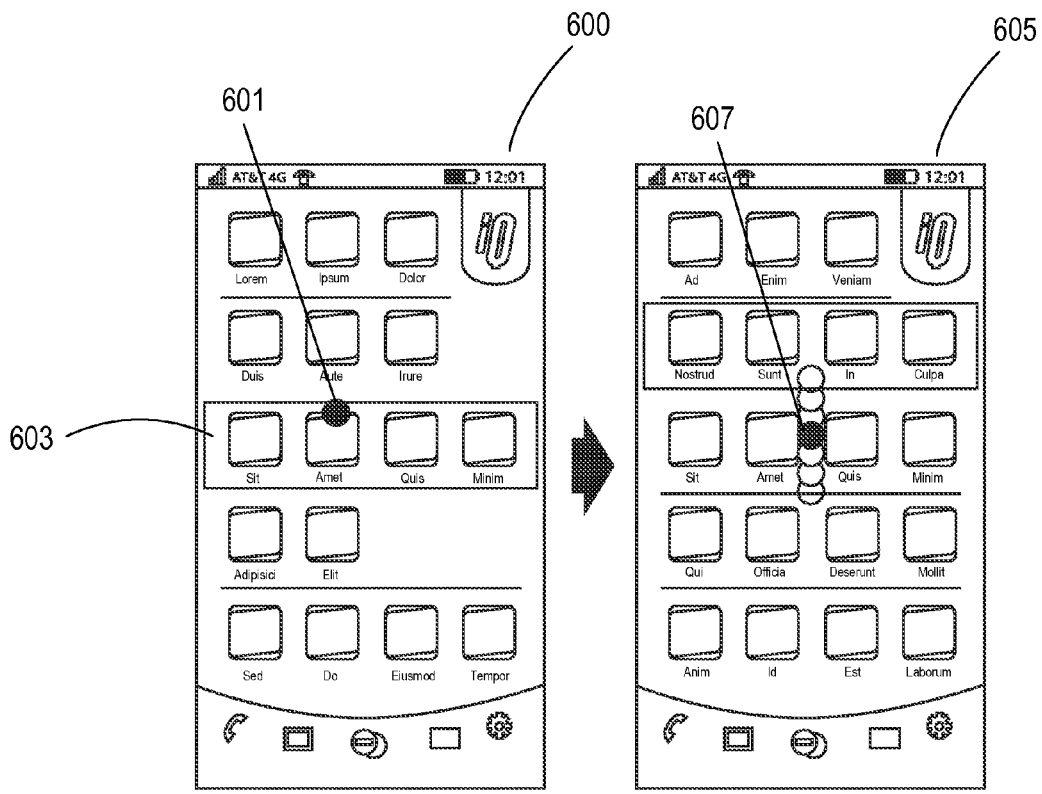
FIG. 6 is a view of a user interface for automatically organizing applications into categorical groups, and user interface gestures for showing category headers for the categorical groups in a user interface, according to aspects of some embodiments of the invention.

FIG. 6. illustrates a manipulating gesture for expanding a channel/category of applications on a device in accordance with principles of preferred embodiments of the invention. As shown, with one gesture detected on a row in the user interface, a user can expand the channel or category to view all items within that channel. In this example, as shown by dot 601, a user taps and holds row 603, which is detected by the system. Row 603 is correlated with a category of items, including items not presented in the home interface 600. Upon detecting the tap-and-hold, all the items belonging in the category or channel is displayed in refreshed page 605. The page may be scrolled to show additional items in the category, as shown the inputted gesture represented by dot 607.

Figure 7:
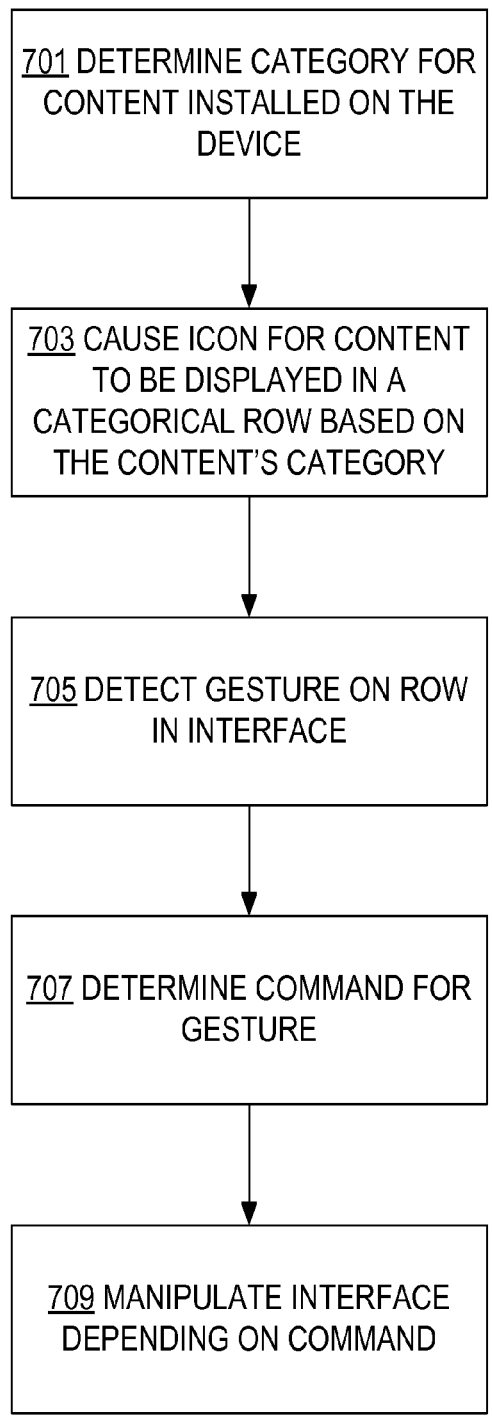
FIG. 7 is a flow diagram illustrating a process for manipulating categorical rows in a user interface, according to aspects of some embodiments of the invention.

FIG. 7 is a flow diagram illustrating a process for manipulating categorical rows in a user interface, according to aspects of some embodiments of the invention. At step 701, the category for content that is installed on a device is determined. In some embodiments, the content is associated with keywords or identification code for identifying its category. At step 703, an icon for the content is caused to be displayed in the categorical row of a grid layout for the content's category. At step 705, a gesture on a row is detected in the interface. At step 707, the command associated with the touchscreen gesture is determined, for example, a two-finger hold and slide, a single-finger hold and slide, or single-finger slide. At step 709, the row interface is moved, rearranged, or otherwise changed depending on the gesture command. For example, according to one preferred embodiment, a two-finger gesture on a row indicates a row is to be moved. The user manipulates the location of the move with the two-finger hold gesture. In another example, according to one preferred embodiment, a single-finger hold on row indicates an expansion of the row to refresh into a new page showing all the items belonging with the category associated with the row. In another example, according to one preferred embodiment, a single-finger slide cause a movement of the icons in the rows toward the direction of the sliding, and reveals categorical labels for the rows in the interface at the head of each row.

Figure 8:
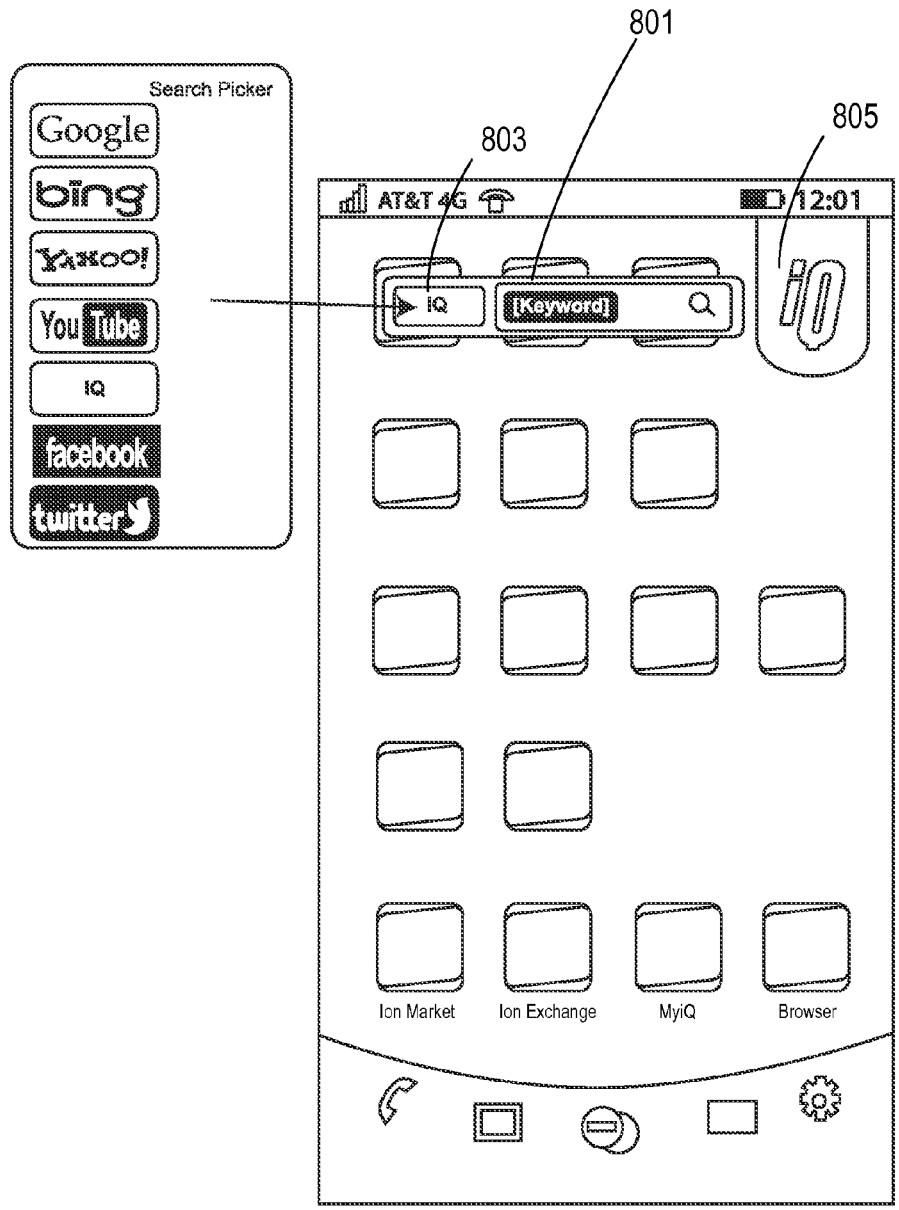
FIG. 8 is a view of a user interface control for selecting a search tool, according to aspects of some embodiments of the invention.

FIG. 8 illustrates a user interface control 801 for selecting a search tool for launching a search. In some embodiments, the interface receives a tap on search button 803, or receives a tap on a default view of a Spinner object in an Android™ interface, which reveals a menu of transactions for alternative search tools. Examples of alternative search tools, as shown in FIG. 8, includes Google, Bing, Yahoo!, YouTube, IQ, Facebook, Twitter. In some embodiments, the user interface control 701 is an overlay that appears when the IQ button 805 is tapped or touched.

In some embodiments, user interface control 801 is a 3-D search bar appears as an overlay over the existing state of the user interface. The 3-D search bar is a user interface element appears that simulates a three-dimensional elongated prism having multiple rectangular faces. Each face features a text box for inputting search words, and an indication 703 of the search engine being used (e.g., Google, Bing, Yahoo!, YouTube, IQ, Facebook, Twitter). The three-dimensional prism can be spun on its central axis by a flicking motion gesture to turn the prism to another face to access other search engines. The number of different search engines accessible is not limited by the number of faces on the prism as shown. For example, if the prism appears as a triangular prism as it is spun, the faces will cycle through all available search engine options sequentially as each of the three faces is changed by a motion gesture on the interface. In other words, the three faces are dynamic and not statically corresponding to any one search engine.

Figure 9:
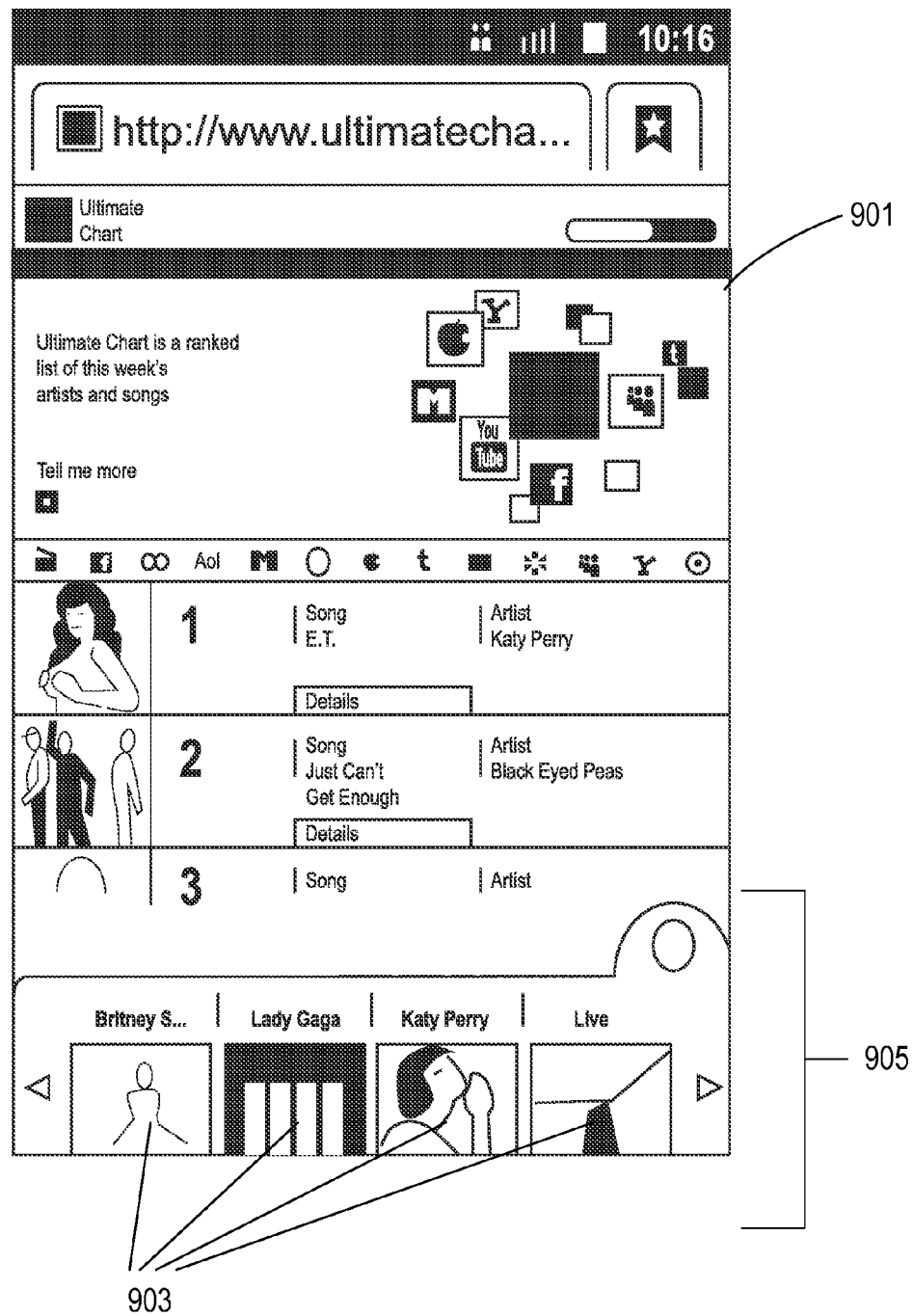
FIG. 9 is a view of a user interface toolbar for presenting automatically presenting related and sponsored keywords based on a loaded browser web page, according to aspects of some embodiments of the invention.

FIG. 9 illustrates a keyword and hyperlink presentation tool that provides a tool for accessing a brand page associated with the keyword. Web page 901 is loaded on a device. The system crawls the site and gathers words used on the site. The system matches the words on the site to the set of keywords maintained by the system. In some embodiments, the keywords are promotional and sponsored. The matches are used to determine a set of hyperlinks for the matches. In some embodiments, hyperlink anchor objects for the hyperlinks include graphical thumbnails 903 with a text label comprising one or more of the matched keywords, or other anchor that may be used for the hyperlink. Hyperlink anchors are caused to be displayed and anchored in user interface overlay 905. In other embodiments, anchor text with a hyperlink is used instead of a graphical thumbnail. In some embodiments, the hyperlink points to a brand page associated with the keyword, which are further described below.

Figure 10:
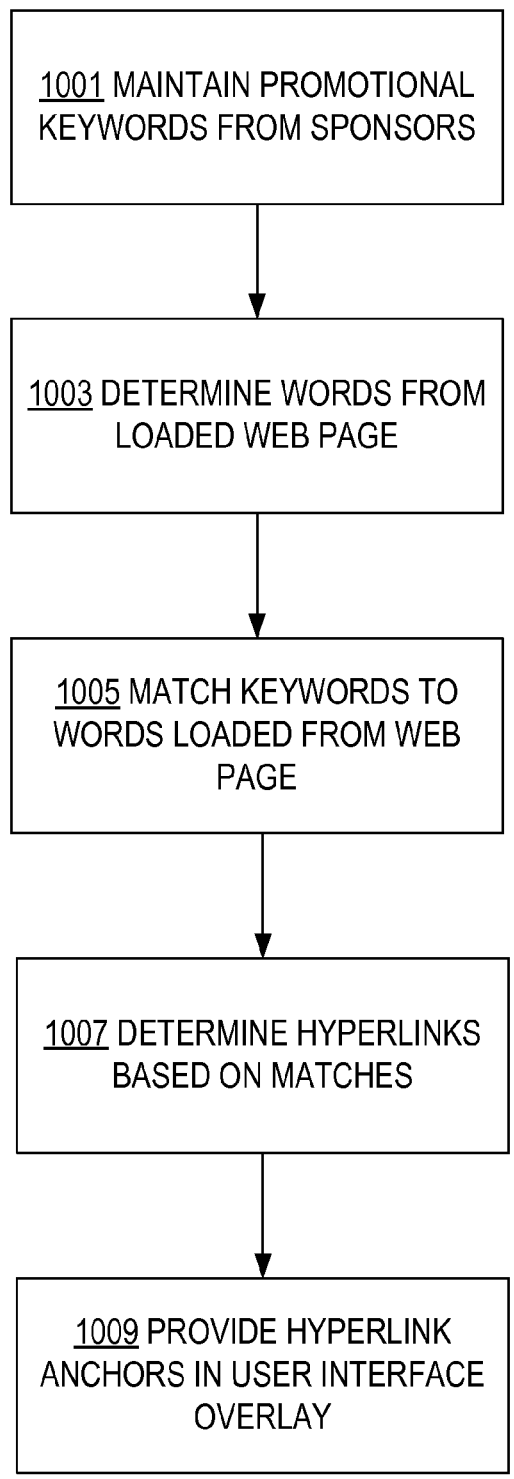
FIG. 10 is a flow diagram illustrating a process for presenting automatically presenting related and sponsored keywords in a user interface toolbar based on a loaded browser web page, according to aspects of some embodiments of the invention.

FIG. 10 is a flow diagram illustrating a process for presenting automatically presenting related and sponsored keywords in a user interface toolbar based on a loaded browser web page, according to aspects of some embodiments of the invention. At step 1001, the system maintains a set of keywords for matching against words found on a web page. In some embodiments, the keywords are promotional and sponsored. At step 1003, for a web page identified as having been loaded by a device, such as ultimatechart.com, the system crawls the site and determines words from the page. At step 1005, matches between the keywords and the words from the webpage are determined. At step 1007, the matches determined at step 1005 are used to determine a set of hyperlinks corresponding to the matches. At step 1009, in some embodiments, the hyperlinks are provided in the user interface as a graphical thumbnail with descriptive text in an interface overlay. In other embodiments, anchor text is used for the hyperlink. The hyperlinks with thumbnails or anchor text or both are presented in an interface overlay that is presented over the web page, as shown at the gray area at the bottom of the screen in FIG. 9. The presentation tool includes a UI element for hiding the tool into a minimized state, and the minimized state is capable of being restored.

In some embodiments, the hyperlinks include hyperlinks originally existing on the web page. In some embodiments, the hyperlinks include hyperlinks or commands to open to brand pages selected by the system based on words or phrases detected on the text of the website. For example, if words from the web page matches the keywords "Britney Spears," the hyperlink provided by the system links to a brand page for the singer Britney Spears. As is described further below, brand pages can be maintained by a content provider or marketing affiliate for promoting the person or entity featured on the page. In other embodiments, the brand pages are content aggregations of an entity, brand, product, or individual person.

Figure 11:
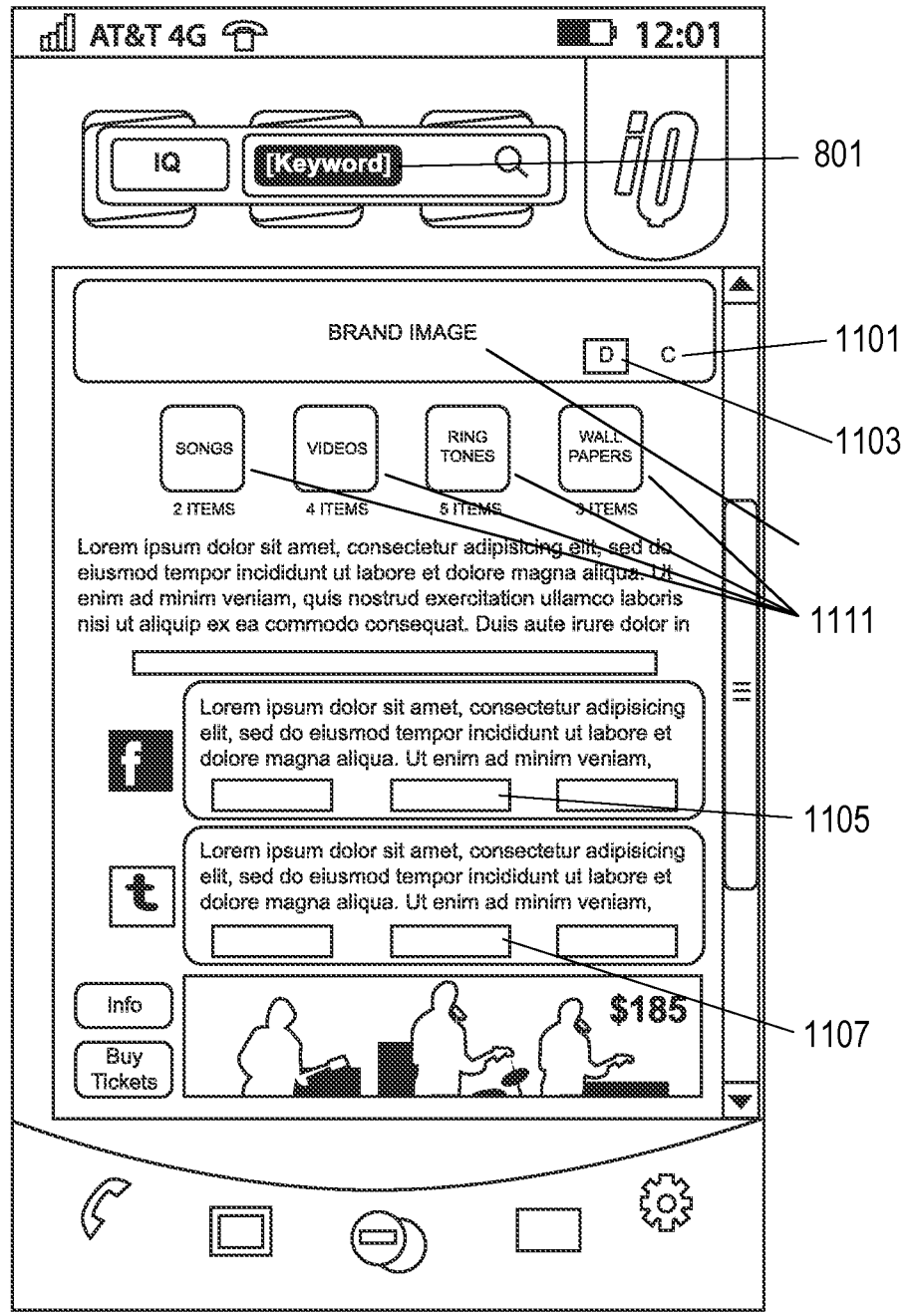
FIG. 11 is a view of a brand page layout, according to aspects of some embodiments of the invention.

FIG. 11 illustrates a example of a layout of a brand page according to some embodiments. Brand pages may be web pages accessed by a web browser in some embodiments. In other embodiments, a brand page is a template for displaying content accessed on a network, including the internet. In still other embodiments, a brand page is a page of static content. The brand page can pop up as an overlay on the user interface of the device. A brand page is one method for displaying the search results from a search using a search tool, such as search bar shown in FIG. 8. A brand page interface includes any one of web page comprising content relating to the matched keyword; a web application having an interface adapted to be populated by content relating to the matched keyword; or a local device application having an interface adapted to be populated by content relating to the matched keyword. Content may include content sourced from a content management system.

In further reference to FIG. 11, search tool 801 can be used to bring up a brand page, or in other embodiments, it could be brought up from interface overlay 905. Brand page includes page control elements, such as a close element 1101 to close the brand page. An add icon element 1103 is provided to add the brand page icon to a home page. In some embodiments, a brand page category is provided to group the brand pages into a categorical row on a web page, as previously described above. Buttons 1105 are provided for launching a related application, such as a Facebook application, for the device, upon receiving a touch or selection of a button. Alternatively, in some embodiments, if Facebook is not installed, the button selection causes the Facebook application to be founded. Buttons 1107 are similarly provided for a different content feed from a different content source, such as a social media feed. Image 1109 includes a brand image representing the subject of the brand page. Buttons 1111 are provided to allow a user to access resources and content linked from the brand page, such as songs, videos, ring tones, and wall papers.

A brand page could be for displaying content about an artist, an athlete, product, brand, or other individuals or entities, collectively referred to hereinafter as "brands." A brand page is configured to aggregate into one page one or more of: contact information of the brand; logs of e-mails and other electronic communication with the brand; content, such as music, videos, articles, product web pages, associated with the brand; information from and links to social networking sites relating to the brand, for example, from Facebook, Twitter, LinkedIn, YouTube, or other sites where a brand can establish a profile to link to; items for sale from the brand, including tickets for concerts and movies, music; website links to web pages relating to the brand, including publicity; information about the brand, for example, biographic information, from a brand's official home page or from an encyclopedic source.

In some embodiments, a brand page is populated by content received from a content management system (CMS) of the brand page's provider. Information for the CMS may be gathered by ingesting data retrieved from public sources, such as music publishers. Examples of content retrieved from a music publisher includes album names, name of songs, album covers, and other data relating to a published album or other collection. Accessing brand pages by the system and method described herein provides an effective way for presenting information from a CMS.

Figure 12:
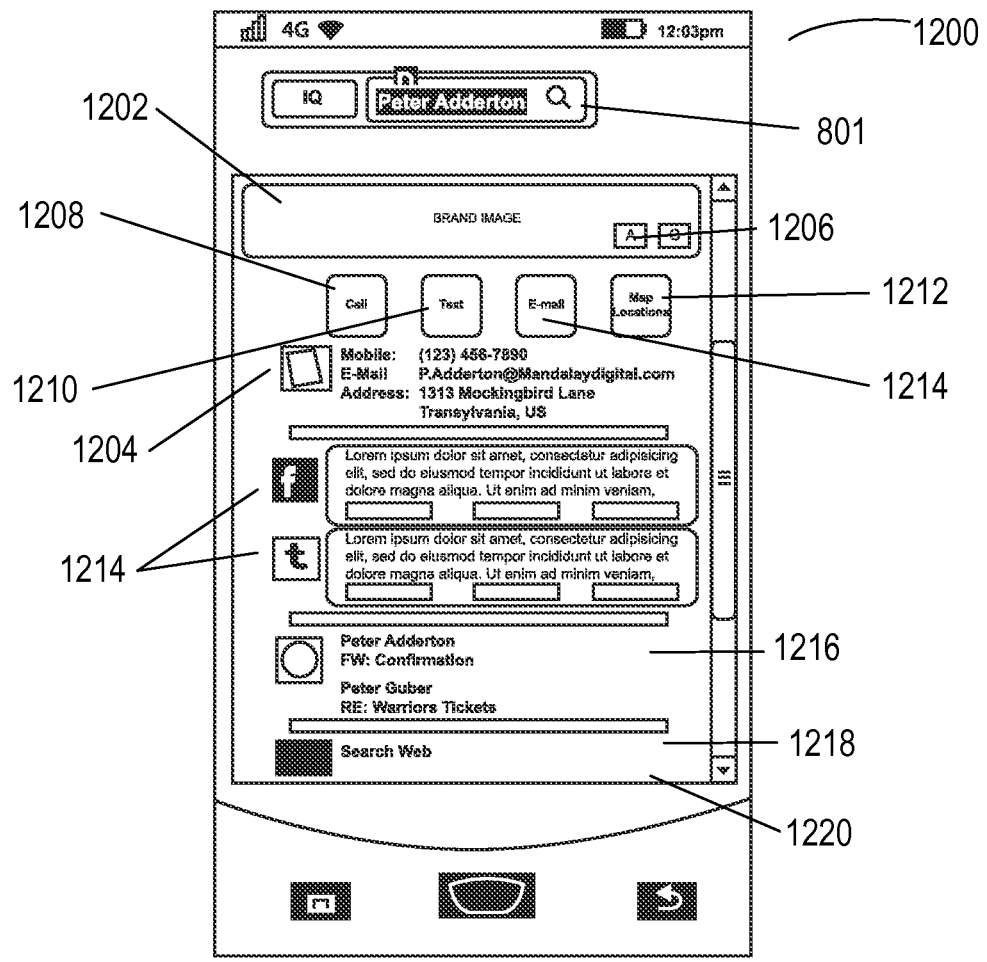
FIG. 12 is a view of an example of a brand page for a personal contact, according to aspects of some embodiments of the invention.

FIG. 12 illustrates an example of a brand page interface for searching, aggregating, and displaying information about a personal contact. FIG. 12 shows a brand pages including content stored at and retrieved from a content management server, locally at the user's device, or other content storage. In some embodiments, the brand page presents content retrieved from a user's list of contacts in response to finding a match for a search from the list of contacts.

In the example shown in FIG. 12 search bar 801 is provided for inputting search terms. Brand page 1200 presents the brand page matching the search. Content for the entity or individual from a content management server, from local storage, or from social networking sources associated with the entity or individual, such as brand image 1202, contact information 1204, including phone number, street address, e-mail address, or other contact information. Command button 1206 is provided for adding search results to a Contacts List of a user.

Communication user interface elements are provided for launching communication to the entity or individual by a communications application, such as by telephone using call button 1208, by SMS or MMS using text button 1210, by e-mail using email button 1214, or by communications applications not shown, such as instant messaging, or video conferencing, using contact information retrieved for the entity or individual in response to a search or other retrieval mechanism for the individual or entity, such as by browsing a list.

Brand page 1200 includes user interface elements for accessing the entity's or individual's location as published to a location-based service, such as Google Maps, Google Latitude or other mapping and location application, such as map and location button 1212.

FIG. 12 further includes one or more feeds 1214 for social media updates from the entity or individual, such as from Facebook, Twitter, Instagram, Google+, Linked-In, Pinterest. In some embodiments, a user can customize a brand page to include certain sources. In some embodiments, a different set of social media updates are selected for different individuals or entities depending on certain criteria, for example, recency of updates.

FIG. 12 further includes a presentation of the entity's or individual's interactions with the user, including content such as the entity's or individual's last e-mails 1216, last SMS or MMS messages 1218, and top calendar or event entries.

Figure 13:
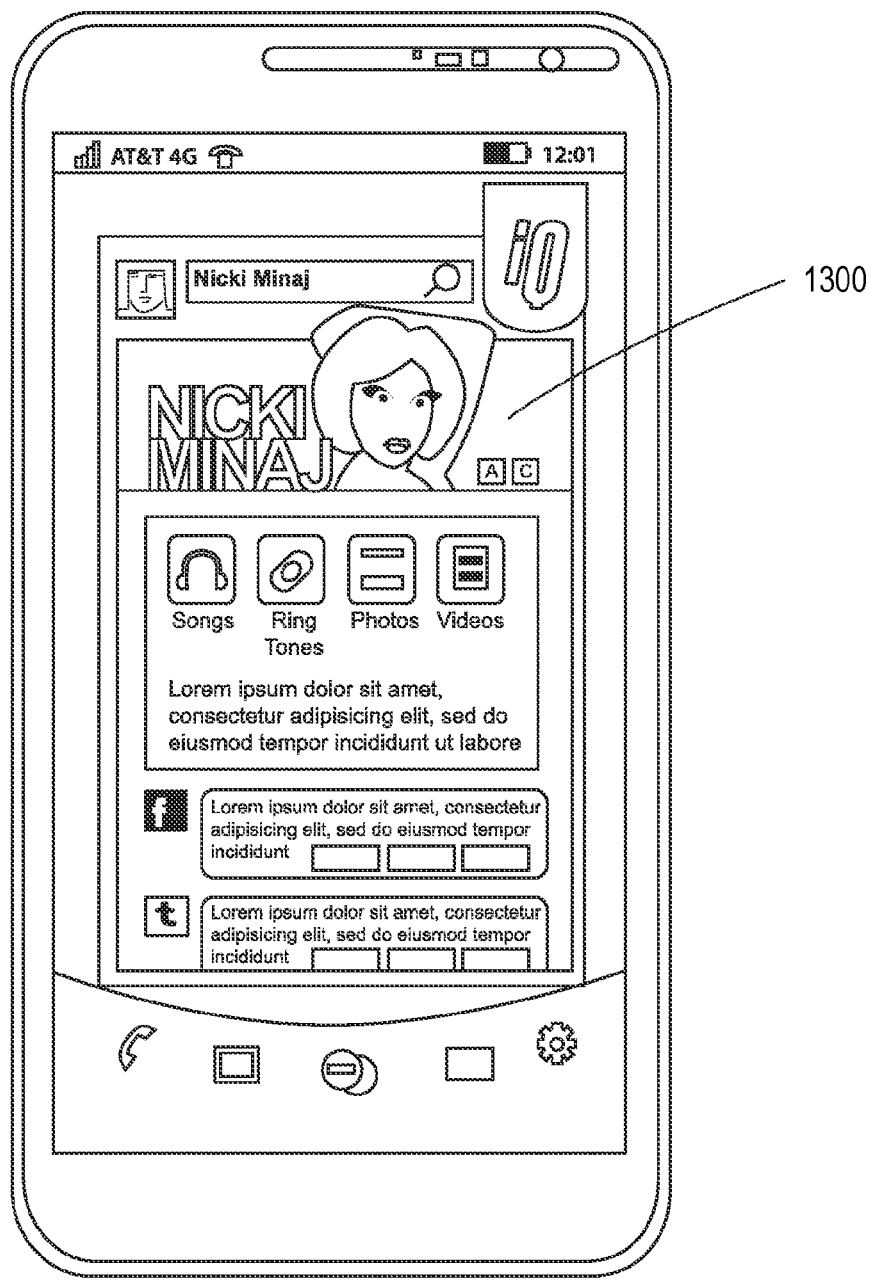
FIG. 13 is a view of an example of a brand page for artist Nicki Minaj, according to aspects of some embodiments of the invention.

FIG. 13 shows an example of a brand page 1300 for artist Nicki Minaj according to the principles of embodiments of the invention shown in FIGS. 11 and 12. The brand page for Nicki Minaj includes an image of Nicki Minaj as the brand image at the top of the page. It includes buttons for accessing categories of content relating to Nicki Minaj, for example songs, videos, ring tones, and wall papers. The brand page for Nicki Minaj includes text providing information about the artist. The brand page includes an area showing content from Facebook, as well as command buttons for accessing the source Facebook content from a browser of by launching the Facebook app. The brand page includes an area showing content from Twitter, as well as command buttons for accessing the source Twitter content from a browser of by launching the Twitter app.

Figure 14:
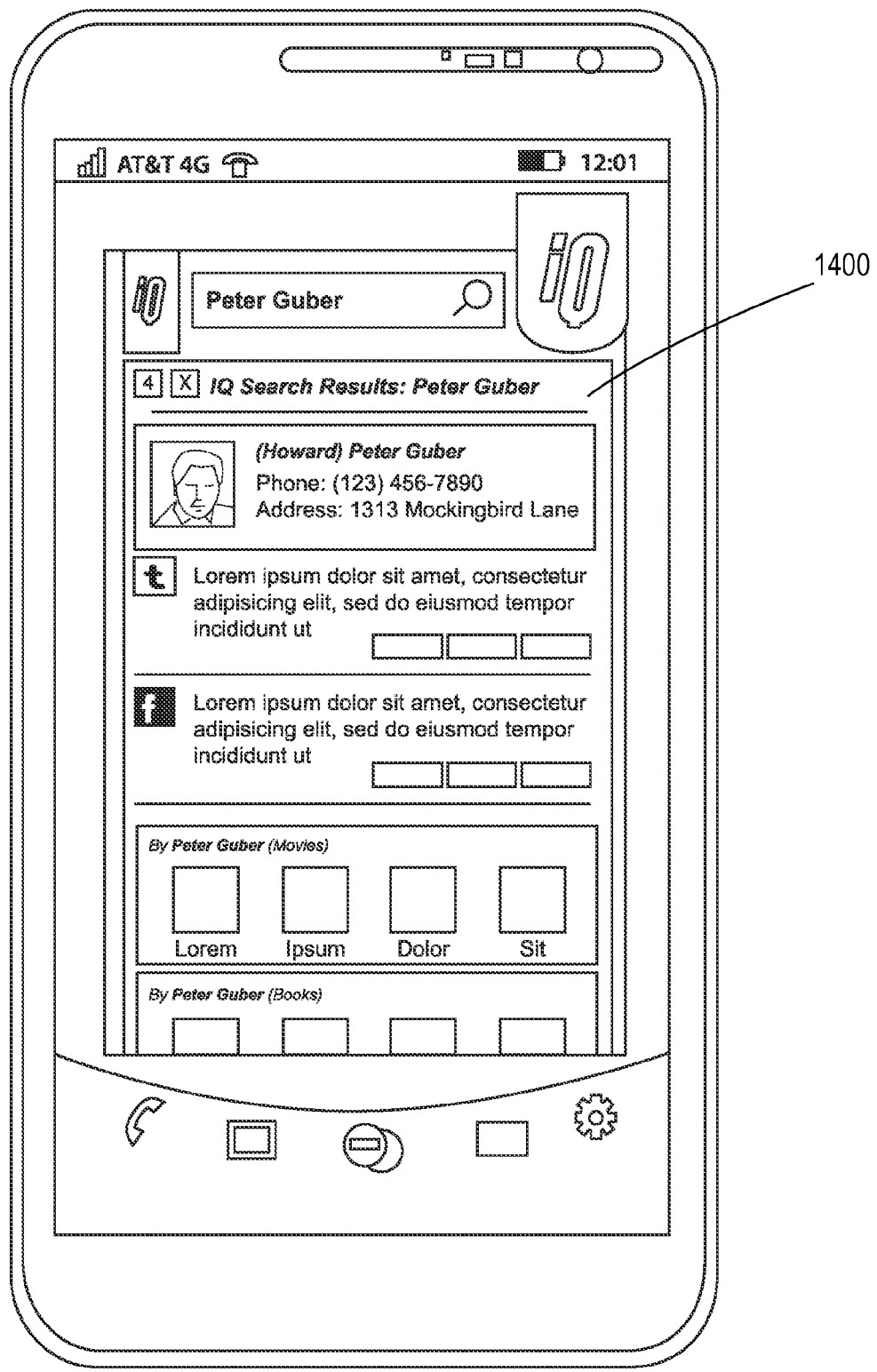
FIG. 14 is a view of an example of a brand page for film producer and author Peter Guber, according to aspects of some embodiments of the invention.

FIG. 14 shows an example of a brand page 1400 for entity Peter Guber according to the principles of embodiments of the invention shown in FIGS. 11 and 12. The brand page further includes areas providing thumbnail images for directly accessing methods for purchasing content, including books and movies relating to the artist.

According to some embodiments of the invention, the user interface is implemented on smart phones or smart-phone-like devices. In some embodiments, smart phones or smart-phone-like devices include devices running smartphone operating systems such as Apple's iOS, Google's Android, or Microsoft's Windows Phone. In some embodiments, smart-phone-like devices include larger devices, such as an Android tablet or iPad. In some embodiments, smart-phone-like devices include devices without wireless wide area network (WWAN) communications components, such as iPod Touch or iPad with only wireless local area network (WLAN) access.

Figure 15:
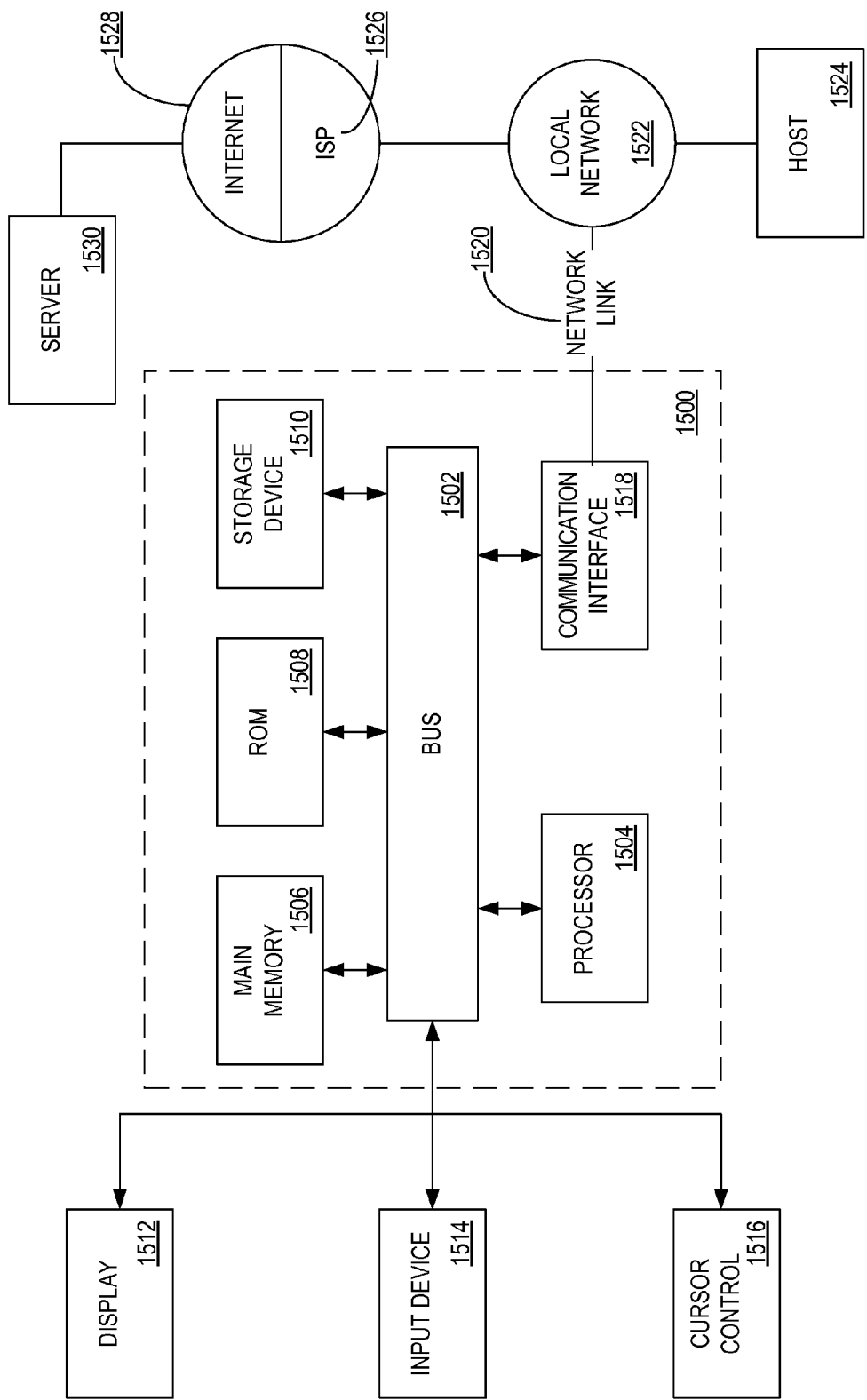
FIG. 15 is a block diagram that illustrates a computer system upon which some embodiments of the invention may be implemented.

FIG. 15 is a block diagram that illustrates a computer system 1500 upon which some embodiments of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT) or liquid crystal display (LCD), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. In some embodiments, input device 1514 is integrated into display 1512, such as a touchscreen display for communicating command selections and gestures to processor 1504. Another type of input device includes a video camera, a depth camera, or a 3D camera. Another type of input device includes a voice command input device, such as a microphone operatively coupled to speech interpretation module for communication command selection to processor 1504.

The invention is related to the use of computer system 1500 for implementing the techniques described herein. According to one embodiment of the invention, those techniques are performed by computer system 1500 in response to processor 1504 executing one or more sequences of one or more instructions contained in main memory 1506. Such instructions may be read into main memory 1506 from another machine-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software. In further embodiments, multiple computer systems 1500 are operatively coupled to implement the embodiments in a distributed system.

The terms "machine-readable medium" as used herein refer to any medium that participates in providing data that causes a machine to operate in a specific fashion. In an embodiment implemented using computer system 1500, various machine-readable media are involved, for example, in providing instructions to processor 1504 for execution. Such a medium may take many forms, including but not limited to storage media and transmission media. Storage media includes both non-volatile media and volatile media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, hard disk, a floppy disk, a flexible disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or other internet connection device, or a modem to provide a data communication connection to a corresponding type of telephone line. As another example, communication interface 1518 may be a local area network (LAN) card to provide a data communication connection to a compatible LAN. Wireless network links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the Internet 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1510 might transmit a requested code for an application program through Internet 1528, ISP 1526, local network 1522 and communication interface 1518.

The received code may be executed by processor 1504 as it is received, and/or stored in storage device 1510, or other non-volatile storage for later execution. In this manner, computer system 1500 may obtain application code in the form of a carrier wave.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A computer-implemented method for automatically organizing a user interface of a smart phone or smart-phone-like device, the method comprising the steps of:
    determining a category for content installed on the device;
    causing an icon for the installed content to be displayed in a categorical row in a grid layout for the content's category;
    detecting a touchscreen gesture on the categorical row;
    determining a command relating to the touchscreen gesture; and
    causing an action on the row based on the command.

2. The method of claim 1, wherein the category includes any one of games, brand page, people, sports, entertainment, news, health and social media.

3. The method of claim 1, wherein the touch screen gestures include a two-finger hold and slide, a single-finger hold and slide, or a single-finger slide.

4. The method of claim 1, wherein the command includes any one of:
    moving the categorical row to another location on the interface;
    showing all the items belonging with the category associated with the categorical row; and
    showing a label for the categorical row.

5. The method of claim 1, wherein the categorical row includes an icon representing recommended content.

6. The method of claim 5, wherein the categorical row where the recommended content icon is caused to be displayed is determined based on the category of the recommended content.

7. A system for automatically organizing a user interface of a smart phone or smart-phone-like device, said system comprising: one or more processors; and a computer-readable medium carrying one or more sequences of instructions, which when executed by said one or more processors, implement a method for automatically organizing a user interface, the method comprising the steps of:
    determining a category for content installed on the device;
    causing an icon for the installed content to be displayed in a categorical row in a grid layout for the content's category;
    detecting a touchscreen gesture on the categorical row;
    determining a command relating to the touchscreen gesture; and
    causing an action on the row based on the command.

8. The system of claim 7, wherein the category includes any one of games, brand page, people, sports, entertainment, news, health and social media.

9. The system of claim 7, wherein the touch screen gestures include a two-finger hold and slide, a single-finger hold and slide, or a single-finger slide.

10. The system of claim 7, wherein the command includes any one of:
    moving the categorical row to another location on the interface;
    showing all the items belonging with the category associated with the categorical row; and
    showing a label for the categorical row.

11. The system of claim 7, wherein the categorical row includes an icon representing recommended content.

12. The system of claim 11, wherein the categorical row where the recommended content icon is caused to be displayed is determined based on the category of the recommended content.

* * * * *